United States Patent [19]

Geisthoff

[11] 4,349,092
[45] Sep. 14, 1982

[54] DEVICE FOR COUPLING AND UNCOUPLING A UNIVERSAL JOINT SHAFT

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 189,360

[22] Filed: Sep. 22, 1980

Related U.S. Application Data

[63] Continuation-in-part of Ser. No. 948,218, Oct. 3, 1978, abandoned.

[30] Foreign Application Priority Data

Oct. 17, 1977 [DE] Fed. Rep. of Germany ....... 2745628

[51] Int. Cl.³ .................... F16B 21/07; F16D 11/10
[52] U.S. Cl. .................... 192/67 R; 74/11; 74/527; 192/114 R; 403/318; 403/325
[58] Field of Search ............. 192/67 R, 89 QT, 99 A, 192/114 R, 114 T; 74/11, 15.2, 15.6, 15.63, 15.66, 15.69, 527; 403/1, 318, 325, 359

[56] References Cited

U.S. PATENT DOCUMENTS

| | | | |
|---|---|---|---|
| 1,504,084 | 8/1924 | Spencer | 192/89 QT |
| 2,003,166 | 5/1935 | Zancan | 192/67 R X |
| 2,081,464 | 5/1937 | Stewart | 74/527 X |
| 2,253,431 | 8/1941 | Johansen | 192/67 R |
| 2,462,363 | 2/1949 | Cook | 192/67 R X |
| 2,922,320 | 1/1960 | Hutter et al. | 74/15.6 X |
| 3,260,541 | 7/1966 | Sadler et al. | 74/11 X |
| 3,747,966 | 7/1973 | Wilkes et al. | 403/325 |
| 3,764,153 | 10/1973 | Miller | 192/67 R X |
| 3,822,951 | 7/1974 | Bornzin | 403/325 X |
| 3,969,033 | 7/1976 | Recker | 403/325 X |

FOREIGN PATENT DOCUMENTS 2537601 5/1976 Fed. Rep. of Germany .
575858 4/1958 Italy ....................... 74/11

*Primary Examiner*—Rodney H. Bonck
*Attorney, Agent, or Firm*—Toren, McGeady & Stanger

[57] ABSTRACT

A universal joint shaft and a power take-off shaft, particularly between an agricultural implement and a tractor, may be coupled and uncoupled by a device which includes a coupling sleeve adapted to be axially locked and unlocked relative to the power take-off shaft by operation of a control ring which is moved in generally parallel relationship with the power take-off shaft between a first and a second position. The coupling sleeve is locked in axial engagement with the power take-off shaft by a spring device which, when engaged by the control ring when the control ring is moved to its second position, operates to unlock the coupling sleeve from the power take-off shaft. The control ring is pivotally mounted and is subjected to the force of an over-center snap spring which maintains the control ring in its first or second position under a spring-biasing force, with the control ring when in its first position being out of engagement with the locking spring device.

7 Claims, 8 Drawing Figures ent invention relates generally to a coupling

DEVICE FOR COUPLING AND UNCOUPLING A UNIVERSAL JOINT SHAFT

This application is a continuation-in-part of application Ser. No. 948,218 filed Oct. 3, 1978 and now abandoned.

The present invention relates generally to a coupling device particularly useful in connection with an agricultural implement which is to be coupled with and uncoupled from a power take-off shaft of a tractor. More particularly, the invention operates to couple and uncouple a universal joint shaft and the power take-off shaft of the tractor by means of a locking device which operates under a spring force, the locking device being held in locked position by a locking sleeve which is provided with an unlocking surface. The coupling device has a pivotally supported stripping lever for unlocking the locking device and for subsequently stripping the coupling of the universal joint shaft from the power take-off shaft of the tractor.

In the prior art it has, for example, been suggested to mount a coupling hub having external toothing on the power take-off shaft of a tractor and to connect the coupling hub to a coupling sleeve having internal toothing through a releasable locking device comprising a spring and locking body. In such a known embodiment, a pot-shaped coupling member is provided at the rear of a tractor, with the coupling member when in the coupled state coaxially surrounding the coupling hub and coupling sleeve. In the circumference of such a pot-shaped coupling member there is arranged a swivel bearing which serves to receive a bearing body which is connected, on the one hand, to the coupling sleeve through a shifting yoke and through a bearing or to a sleeve mounted on the universal joint shaft, particularly a protective funnel, and on the other hand, to a coupling lever. In this connection, reference is made to German Pat. No. 2,537,601.

This known embodiment is found to be rather cumbersome in its design and it will require the use of tools for mounting the coupling hub on the power take-off shaft of the tractor. Since, in such a case, it becomes necessary to perform manual operations in the free space between the implement to be connected and the tractor, the danger of accidents or injury is increased. Moreover, in the known coupling for universal joint shafts, a reliable operation over a long period of time becomes rather doubtful because of the multitude of individual parts which are movable relative to each other and which are subject to significant contamination when utilized in an agricultural application.

In the known embodiment of a coupling for a universal joint shaft, it is moreover disadvantageous that universal joint shafts of older designs cannot be connected without difficulty, since for such a purpose the coupling hub must necessarily be removed from the power take-off shaft. Accordingly, it is found rather difficult to quickly exchange implements which are to be connected.

The present invention is directed toward providing a device for coupling and uncoupling a universal joint shaft which features increased operational safety and which will ensure that not only universal joint shafts of older design may be coupled to tractors which are provided with the coupling device of the invention, but also that universal joint shafts which are intended for new coupling systems may also be coupled to tractors.

Furthermore, the coupling device of the invention is intended to provide a structure which is inexpensive to produce, simple in design and relatively insensitive to contamination. The device of the invention utilizes relatively few parts which are movable relative to each other. Additionally, the device is adaptable for use with a coupling device of an implement wherein utilization is made of interchangeable gearings.

SUMMARY OF THE INVENTION

The device of the present invention provides a swinging yoke or fork formed with a swinging lever which is swingably connected to a stripping lever in the direction of stripping and wherein the swinging yoke is loaded by a spring in such a manner that a control ring may be snapped in two end positions beyond a dead-center position of the spring, the control ring being connected to the swinging yoke and surrounding the power take-off shaft with some clearance or play being provided to enable axial movement on the power take-off shaft.

The design of the invention enables the coupling device to be manufactured with significantly simpler production techniques. During coupling, the control ring surrounding the power take-off shaft with clearance is located at that side of the power take-off shaft which faces away from the tractor. When the coupling sleeve is placed on the power take-off shaft, first the unlocking surface of the locking sleeve of the locking device is caught or engaged by the control ring and is pushed into the open position. When the coupling sleeve slides onto the power take-off shaft even further, the locking sleeve will be held in the open position by means of the force of the spring until the locking device has made contact with the power take-off shaft. As soon as the coupling sleeve slides onto the power take-off shaft to an extent where the spring overcomes its dead-center position, the control ring will lose contact with the coupling sleeve and will jump or snap into its end position on the side of the tractor. This end position is designed in such a way that between the coupling sleeve and the control ring there remains a sufficient free space which prevents the two parts from coming into contact while the power take-off shaft rotates.

In another embodiment of the invention, the shaft is supported in a journal arranged on a pot-shaped protective member wherein a locking projection is provided at the journal and the stripping lever may be locked behind this locking projection in its end position facing toward the tractor, the locking effect being produced by the spring. In accordance with another feature of the invention, the control ring is provided on both sides with a guide member with grooves extending parallel to the axis of the power take-off shaft being provided in the guide members, the guide members being movable in a transitive manner on guides which extend parallel to the axis of the power take-off shaft.

In this manner, it becomes possible to move the control ring concentrically with the power take-off shaft along its entire path of movement between the two end positions of the ring. The control ring is thus held with its end faces extending in a plane which is continuously oriented perpendicularly to the axis of the power take-off shaft.

In a further embodiment of the invention, the coupling device is arranged at the protective hood or at the pot-shaped protective member of a tractor. In the case where such a protective hood or protective pot-shaped member is arranged at the rear of the tractor, the coupling device may be easily mounted with little effort onto the aforementioned protective members.

A tractor is frequently provided with a protective hood which may be folded up. The coupling device can be connected to such a protective hood without requiring significant changes and by designing the control ring as a yoke which is open in a direction opposite to the folding direction of the hood.

Because of the special design of the control ring as a yoke, the coupling device can easily follow the folding movement of the protective hood.

In a special embodiment of the invention, the control ring may be configured to simultaneously surround two or more power take-off shafts. In such an embodiment, advantages arise inasmuch as the coupling device may be utilized for all power take-off shafts provided at the tractor.

In accordance with another feature of the invention, the yoke is constructed with an arc-shaped stop projection which acts on the locking ring in such a manner that the pressure point of the stop projection extends through the center of the power take-off shaft in any angular position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
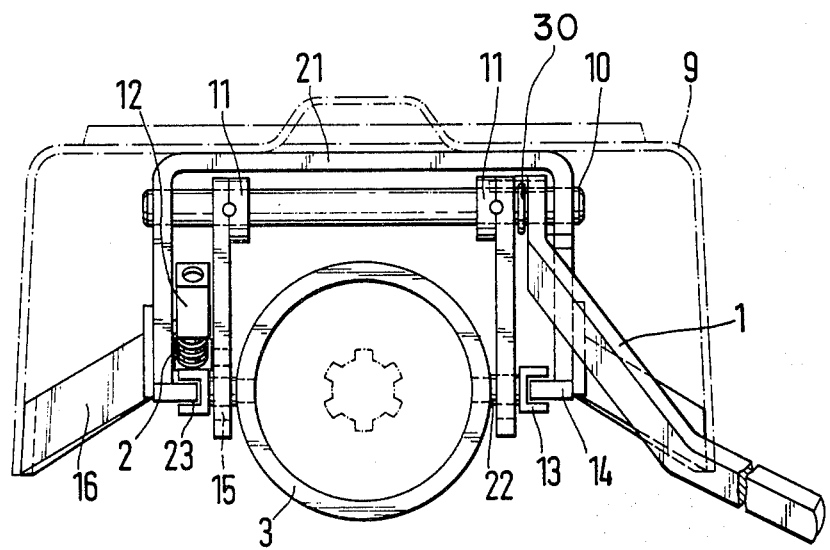
FIG. 1 is a top view of the coupling device in accordance with the invention.

Referring now to the drawings wherein similar parts are identified with like reference characters, the coupling device of the invention is shown as consisting essentially of a frame 21 which may, for example, be mounted by means of mounting plates 16 upon a standard protective hood 9 of a tractor. A shaft 10 is rotatably supported in the frame 21. The shaft 10 is rigidly connected with a pair of pivotable levers 11 which, together with the shaft 10, form a bifurcated stripper assembly. At the ends of the pivotable levers 11 opposite the ends connected with the shaft 10 there are provided oblong holes 15 through which trunnions 22 extend. The trunnions 22 are affixed to the levers 11 and have stubs extending toward the interior of the bifurcated stripper assembly by means of which the trunnions are rigidly connected to a control ring 3. At their outwardly facing ends, the trunnions 22 are equipped with guide members 13 which are provided with rectangular grooves 23 extending parallel relative to each other.

The grooves 23 are engaged by guides 14 which are rigidly connected with the frame 21 and which extend parallel to each other. As a result of this arrangement, movement of the control ring 3 is effected so that the ring 3 will always be oriented in a plane which extends perpendicularly to the axis of a power take-off shaft 20. Furthermore, it will be seen that as a result of the mounting and guide arrangement depicted, the control ring 3 will extend coaxially with the power take-off shaft 20 and in its movement will also move parallel to the power take-off shaft while maintaining its coaxial relative position.

Provided at one of the pivotable levers 11 is a bearing point 17 for a catch spring 2. At its other end the catch spring 2 is supported through a spring support 12, and a fixed spring bearing point 18 is provided at the frame in such a manner that the spring will snap through a dead-center position in the case of axial movement of the control ring 3. As a result of this arrangement, the catch spring 2 will operate so that the control ring 3 will be capable of being snapped in at two end positions.

Figure 2:
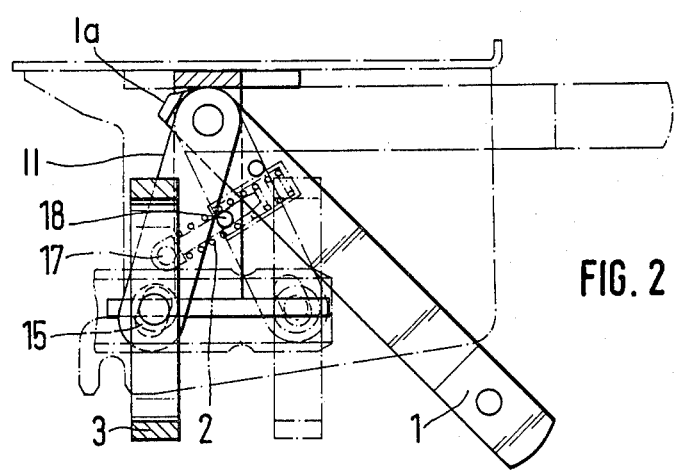
FIG. 2 is a partial side view of the coupling device.

A stripping lever 1 pivotally supported on the shaft 10 operates to effect pivotal movement of the bifurcated stripper assembly by positive engagement with one of the levers 11. The lever 1 is formed with with an engagement pawl 1a which engages the lever 11 when the lever 1 is rotated counterclockwise about the shaft 10, as viewed in FIG. 2, thus to effect movement of the control ring 3 in a direction toward the outer end of the power take-off shaft 20 or to the position indicated in dash-dot line to the right in FIG. 2. In this position of the control ring 3, the lever 1 may once again be brought into its initial position by means of a spring 30 or by its own weight through the force of gravity. Injury to an operator is prevented since the lever 1 will return to the position shown in FIG. 2 and will thus not be in driven engagement with the lever 11 when the ring 3 is returned to its leftmost position shown in solid line in FIG. 2.

Thus, it will be seen that as a safety feature, the stripping lever 1 is in engagement with the lever 11 only when a stripping operation is to be performed and that accidental movement of the lever 1 which might cause injury to an operator is prevented.

Figure 3:
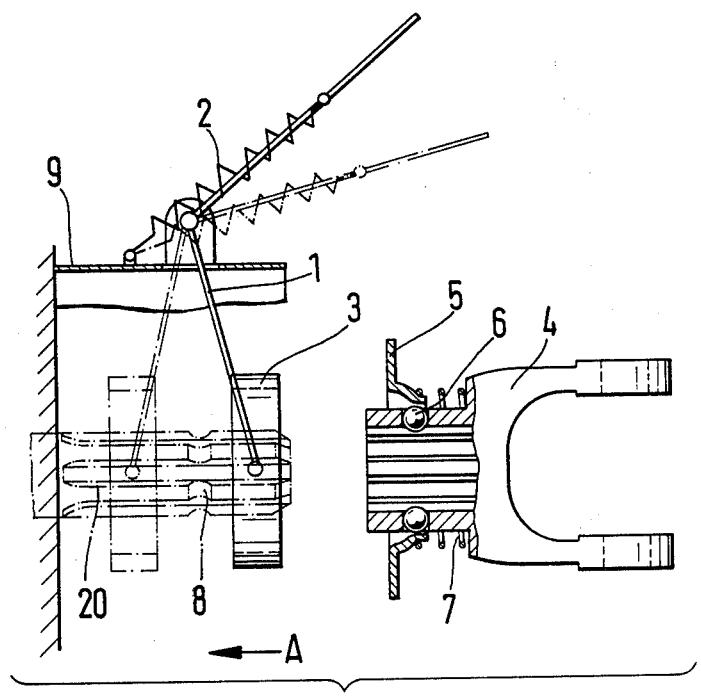
FIG. 3 is a partially sectioned side elevation indicating the mode of operation of the device.

FIG. 3 shows the operating principle of the coupling device. With the device in the uncoupled state, the control ring 3 is arranged to the right, as seen in FIG. 3, at the outer end of the power take-off shaft 20. The sleeve of a yoke 4 is provided with a locking device which essentially consists of lock bodies 6, a lock ring 5 and a lock spring 7. The lock spring 7 presses the lock ring 5 toward the left in FIG. 3 to its normal position over the lock bodies 6 in such a manner that the latter are held in a locked position. When the coupling sleeve of the yoke 4 slides onto the power take-off shaft 20, the lock ring 5 will run up against the control ring 3. Since the force of the over-center catch spring 2 is larger than the force of the lock spring 7, the lock ring 5 is moved toward the right as seen in FIG. 3 against the force of the spring 7 and the lock bodies 6 will move radially outwardly. Thus, the lock bodies may move over the power take-off shaft 20, and the coupling sleeve may be moved by sliding onto the power take-off shaft 20 until the lock bodies 6 engage the annular groove 8. The dead-center position of the catch spring 2 is designed in such a manner that, when this position is reached, the control ring 3 is snapped into its left end position, whereby it is ensured that in this position there is sufficient free space between the control ring 3 and the sleeve of the yoke 4 such that the parts may freely rotate without making contact. Simultaneously, the lock ring 5 will again snap into its leftmost position under the influence of the spring 7 in order to hold the bodies 6 in the locked position so that the yoke 4 is axially secured on the power take-off shaft 20 with a positive engagement.

For stripping the yoke 4 from the power take-off shaft 20, the stripping lever 1 is operated in such a manner that the control ring 3 moves toward the right to the outer end of the power take-off shaft 20. In so doing, the control ring 3 first makes contact with the lock ring 5 and then pushes the lock ring 5 against the force of the spring 7 out of the locked position. As a result, the lock bodies 6 will be free to move radially outwardly out of the locked position. By swinging the stripping lever 1 further, the sleeve of the yoke 4 is stripped from the power take-off shaft 20, the force of the catch spring 2 becoming additionally effective in this direction after it has overcome its dead-center position. The coupling device then would be in its initial position for starting a new coupling procedure.

Figure 4:
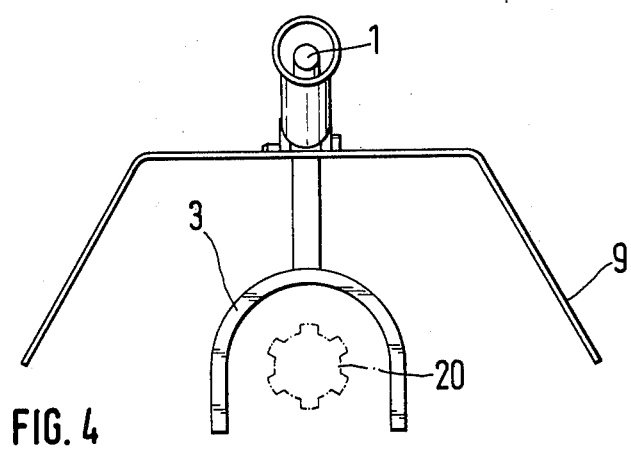
FIG. 4 is a view showing a folding embodiment of the coupling device at a folding protective hood.

FIG. 4 shows a coupling device in accordance with the invention wherein the control ring 3 is constructed as a bifurcated member or fork which is open toward the bottom. Such an embodiment is advantageous when the coupling device is to be used in connection with a protective hood 9 which can be folded off. In this case, the protective hood 9 can be folded up together with the coupling device without interference by the coupling device.

Figure 5:
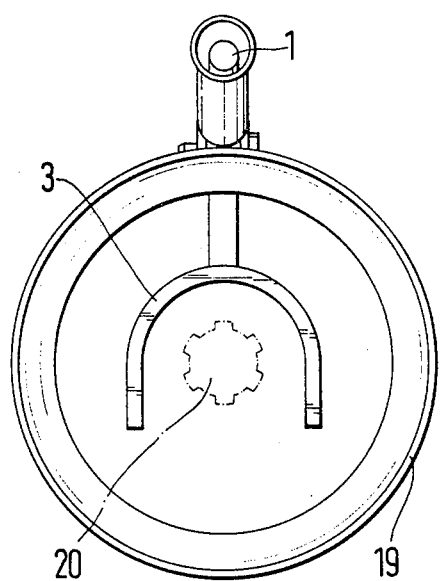
FIG. 5 shows a folding embodiment of the device at a folding pot-shaped protective member.

FIG. 5 also shows a coupling device which is provided with a control ring 3 constructed as a fork or bifurcated member. This coupling device is intended to be used in connection with a pot-shaped protective member which can be folded off.

Figure 6:
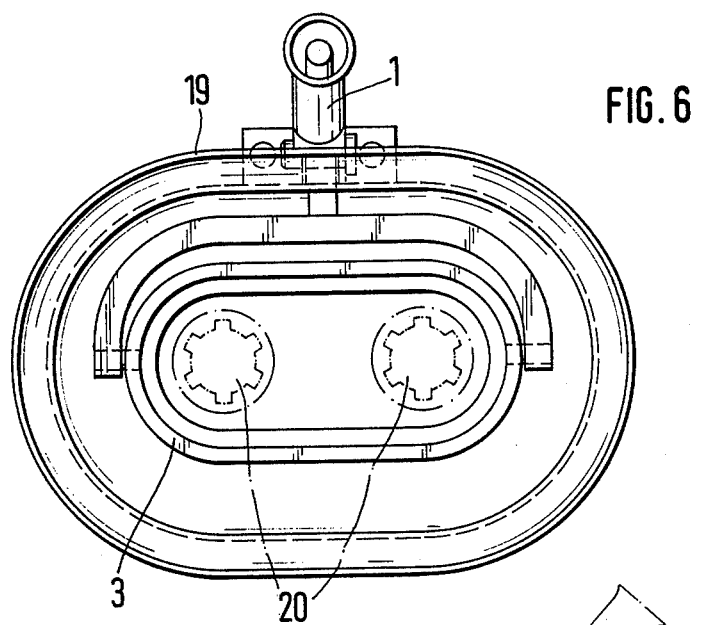
FIG. 6 is a view of an embodiment of the coupling device wherein two power take-off shafts may be alternately used.

FIG. 6 shows two power take-off shafts 20 which are surrounded by a single control ring 3 so that the coupling procedure may be effected, in the manner described above, at each of the two power take-off shafts 20.

Figure 7:
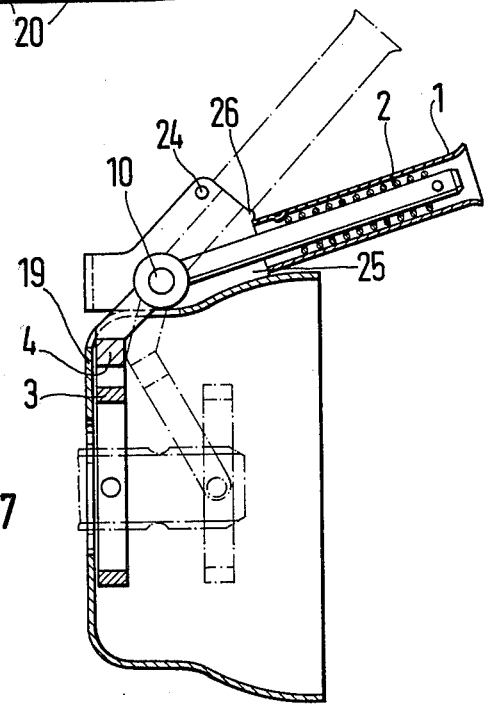
FIG. 7 is a side view of a coupling device with release locking.

FIG. 7 illustrates an embodiment of the invention wherein the stripping lever 1 together with the shaft 10 is supported outside of the pot-shaped protective member. At a journal 25 there is provided a lock projection 26 behind which the stripping lever 1 may be locked in an end position serving to receive a coupling sleeve. By means of this arrangement, unintentional stripping of the coupling sleeve (not shown) is prevented.

Figure 8:
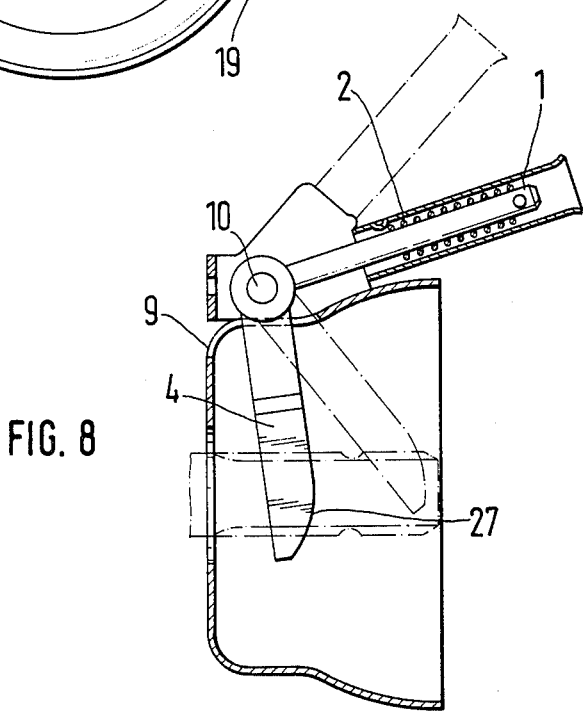
FIG. 8 is a side view showing the coupling device with a constantly effective length of the swinging yoke.

FIG. 8 depicts a coupling device for universal joint shafts wherein the yoke 4 is provided with an arc-shaped stop projection 27. The outer contour of the stop projection 27 is designed in such a manner that, when the stripping lever 1 is swung about the shaft 10, the pressure point of the stop projection 27 on the coupling sleeve (not shown) is always in the center of the power take-off shaft.

If a yoke of conventional design is to be mounted on a power take-off shaft provided with the coupling device, the control ring 3 is moved into that end position which faces away from the outer end of the power take-off shaft 20. A coupling sleeve which is to be coupled may now be mounted on the power take-off shaft 20 by conventional means.

While specific embodiments of the invention have been shown and described in detail to illustrate the application of the inventive principles, it will be understood that the invention may be embodied otherwise without departing from such principles.

What is claimed is:

1. A device for coupling and uncoupling a universal joint shaft and power take-off shaft means, particularly between an agricultural implement and a tractor, comprising: a coupling sleeve adapted to be coaxially coupled in driving engagement with said power take-off shaft means; locking means for axially locking and unlocking said sleeve and said power take-off shaft means; lock spring means biasing said locking means to the locked position; a control ring movable in generally parallel relationship with said power take-off shaft means between a first and a second position, said control ring when moved to said second position operating to engage said locking means to unlock said sleeve from said power take-off shaft means; pivotally mounted stripping means having said control ring mounted thereon; lever means adapted to engage said stripping means for actuating said control ring from said first to said second position; overcenter snap spring means operatively associated with said stripping means for enabling said control ring to be selectively snapped to said first and second position and for retaining said control ring at said positions under a spring-biasing force; said control ring, when in said first position, being out of engagement with said locking means to enable said locking means to maintain the locked engagement between said coupling sleeve and said power take-off shaft means; guide means extending parallel to said power take-off shaft means engaging said control ring to maintain movement of said control ring between said first and second positions generally parallel to said power take-off shaft means, said guide means comprising means mounted on opposite sides of said control ring defining guide slots; and guide members extending parallel to the power take-off shaft means slidably engaging said guide slots.

2. A device according to claim 1 wherein said overcenter snap spring means operate to exert a spring force on said control ring greater than the force of said lock spring means.

3. Device according to claim 1 further comprising: a shaft having said stripping means mounted thereon; a journal supporting said shaft; a protective member having said journal arranged thereat and a lock projection provided at said journal adapted to be engaged by said lever means under the force of said spring means for maintaining said control ring in said second position.

4. A device according to claim 1 wherein said overcenter snap spring means operates to exert a spring force on said control ring overcoming the force of said locking spring means when said control ring is moved to said second position to engage said locking means.

5. A device according to claim 1 wherein said locking means comprises annular grooves formed in said power take-off shaft means and balls on said coupling sleeve adapted to be brought into engagement with said annular grooves under the force of said locking spring means.

6. A device according to claim 1 wherein said lever means is maintained out of driving engagement with said stripping means except during actuation of said control ring from said first to said second position.

7. A device according to claim 1 wherein movement of said control ring is maintained inoperative to actuate movement of said lever means.

* * * * *